(12) United States Patent
Berstis

(10) Patent No.: US 6,720,981 B1
(45) Date of Patent: Apr. 13, 2004

(54) METHOD, SYSTEM AND PROGRAM PRODUCT FOR ANIMATED WEB PAGE CONSTRUCTION AND DISPLAY

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/457,221

(22) Filed: Dec. 8, 1999

(51) Int. Cl.[7] .................... G06F 3/14; G06T 13/00; G06T 11/00
(52) U.S. Cl. ................ 345/760; 345/748; 345/772; 345/473; 345/630; 715/513
(58) Field of Search ............... 345/760, 748, 345/772, 839, 977, 706, 733, 738, 764, 781, 757, 758, 473, 474, 950, 952, 960, 629, 630, 634, 638, 683, 769, 770; 715/513, 515, 514, 526; 434/118

(56) References Cited

U.S. PATENT DOCUMENTS

| | | | |
|---|---|---|---|
| 5,524,195 A | * 6/1996 | Clanton et al. ......... 345/473 X |
| 5,572,643 A | * 11/1996 | Judson .................... 715/513 X |
| 5,845,299 A | 12/1998 | Arora et al. .................. 707/13 |
| 5,870,559 A | 2/1999 | Leshem et al. ......... 395/200.54 |
| 5,896,132 A | 4/1999 | Berstis et al. ................ 345/341 |
| 6,075,532 A | * 6/2000 | Colleran et al. ............ 345/473 |
| 6,377,928 B1 | * 4/2002 | Saxena et al. .......... 715/513 X |
| 6,466,213 B2 | * 10/2002 | Bickmore et al. .......... 345/473 |
| 2002/0097266 A1 | * 7/2002 | Hachiya et al. ......... 345/706 X |

* cited by examiner

Primary Examiner—Raymond J. Bayerl
(74) Attorney, Agent, or Firm—Leslie A. Van Leeuwen; Bracewell & Patterson, L.L.P.

(57) ABSTRACT

A system and method are disclosed in which a browser application animates web page construction. The animated construction involves the browser associating each web object with an animated mover character. The web object and animated mover character are moved from outside a boundary area of the web page to its programmed location within the web page wherein the movement simulates that the animated mover character is building the web page. The browser processes all of the web objects to display the entire web page with all of the web objects.

11 Claims, 9 Drawing Sheets

METHOD, SYSTEM AND PROGRAM PRODUCT FOR ANIMATED WEB PAGE CONSTRUCTION AND DISPLAY

BACKGROUND OF THE INVENTION

1. Technical Field

The present invention relates in general to construction, display, and viewing of web pages, and in particular to web page animated construction and display and zoom in and out viewing of a large web page.

2. Description of the Related Art

Browsing of web pages has become commonplace in the use of computers and the Internet or the World Wide Web. When retrieving and browsing a web page, the http address of the web page is specified. The browser retrieves the html file that corresponds to the http address. The browser retrieves and displays the web page. However, the time for retrieving, loading, or downloading a web page may be quite extensive, and the user, especially those persons new to browsing the web, may become quite bored and impatient during this time that the web page is loading, downloading, and being constructed. The images gradually appear on the computer screen as the computer processes and displays the web page information, and the user has to patiently wait for these images to be displayed.

Furthermore, many web pages are relatively large, and they extend beyond the current web page view that displays the web page on the computer screen. Thus, only a portion of the entire web page is displayed at a time in the available web page view for the user. For some users and/or new users who are browsing the web, the limited web page view, which displays only a portion of the large web page, may be misleading to them in making them think that they are viewing the entire large web page. Some of the users may not know what to do to view the rest of the web page, or they may believe that they were viewing the entire web page.

FIG. 3 is a prior art figure showing a view of a computer screen 90 with a retrieved web page 100 therein. The web page is identified with a web page title 102 and has various web objects 104 and has a scroll bar 106 for scrolling through the web page. A browser executes a typical web page drawing algorithm for constructing the web page 100 on the screen. One problem encountered by many users is that they may get bored with waiting for the web objects to appear and be fully displayed on the web page 100. Also, the viewing area of the web page 100 is limited to only being able to show a portion of the web page 100. New and even some existing users may be misled in thinking that the portion of the web page 100 shown in the viewing area is the entire web page 100.

Also, "more" bars on web pages allow a user or viewer to scroll or access additional, unseen portions of the web page that extend beyond the viewing area of the web page. U.S. Pat. No. 5,896,132 provides a prior art example of such "more" bars, and this patent is incorporated by reference herein. However, these "more" bars may not sufficiently or necessarily indicate to the user or viewer that additional, unseen portions of the web page still exist or show the relative size or general page layout compared to what is shown on the computer screen.

It would therefore be advantageous and desirable to provide a system and method for constructing and displaying web pages that make the web page loading process more interesting on the computer screen for the user. It would also be advantageous and desirable to provide a system and method for enabling and aiding the user to know and be indicated of the entire size of the web page being retrieved by the user. It would still further be advantageous and desirable to provide a web page animated construction and display that involves animated mover characters moving portions or pieces of the web page onto the web page viewing area as the web page is being constructed so that the user is provided with at least some further interest during the web page construction process. It would still also be advantageous and desirable to provide zoom in and out viewing capabilities of a large web page as the web page is retrieved so that the user has knowledge and a general indication of the relative size of the entire web page. It would still further be advantageous and desirable to provide a web browser that displays a web page that uses both the web page animated construction and display and zoom in and out viewing of the entire web page.

SUMMARY OF THE INVENTION

It is therefore one object of the present invention to provide a system and method for constructing and displaying web pages that make the web page loading process more interesting on the computer screen for the user.

It is another object of the present invention to provide a system and method for enabling and aiding the user to know and be indicated of the entire size of the web page being retrieved by the user.

It is still a further object of the present invention to provide a web page animated construction and display that involves animated mover characters moving portions or pieces of the web page onto the web page viewing area as the web page is being constructed so that the user is provided with at least some further interest during the web page construction process.

It is still another object of the present invention to provide zoom in and out viewing capabilities of a large web page as the web page is retrieved so that the user has knowledge and a general indication of the relative size of the entire web page.

It is still a further object of the present invention to provide a web browser that displays a web page that uses both the web page animated construction and display and zoom in and out viewing of the entire web page.

The foregoing objects are achieved as is now described. A system and method of using a browser for displaying a web page on a computer screen wherein the browser executes a web page animated construction and/or provides zoom in and out viewing of the web page as the web page is constructed. The animated construction involves the browser associating each web object with an animated mover character. The web object and animated mover character are moved from outside a boundary area of the web page to its programmed location within the web page wherein the movement simulates that the animated mover character is building the web page. The zoom in and out viewing of a web page involves execution of a web page construction algorithm, such as the web page animated construction algorithm, for display of the web objects on the web page. The browser determines whether web object display has exceeded a current zoomed view of the web page and zooms out the current zoomed view to accommodate additional web objects if display has exceeded the current zoomed view. The browser processes all of the web objects to display the entire web page with all of the web objects. The browser then zooms back into the current view of the web page to only an initial portion of the web page. A scroll indicator with the current view of the web page for indicating to a user scrollability and accessibility to more and other portions of the web page.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention provides a system and method for constructing and displaying web pages that make the web page loading process more interesting on the computer screen for the user, and it also provides a system and method for enabling and aiding the user to know and be indicated of the entire size of the web page being retrieved by the user. The present invention discloses a web page animated construction and display that involves animated mover characters moving portions or pieces of the web page onto the web page viewing area as the web page is being constructed so that the user is provided with at least some further interest during the web page construction process. The present invention further discloses zoom in and out viewing capabilities of a large web page as the web page is retrieved so that the user has knowledge and a general indication of the relative size of the entire web page. The present invention is also able to provide a web browser that displays a web page that uses both the web page animated construction and display and zoom in and out viewing of the entire web page.

Figure 1:
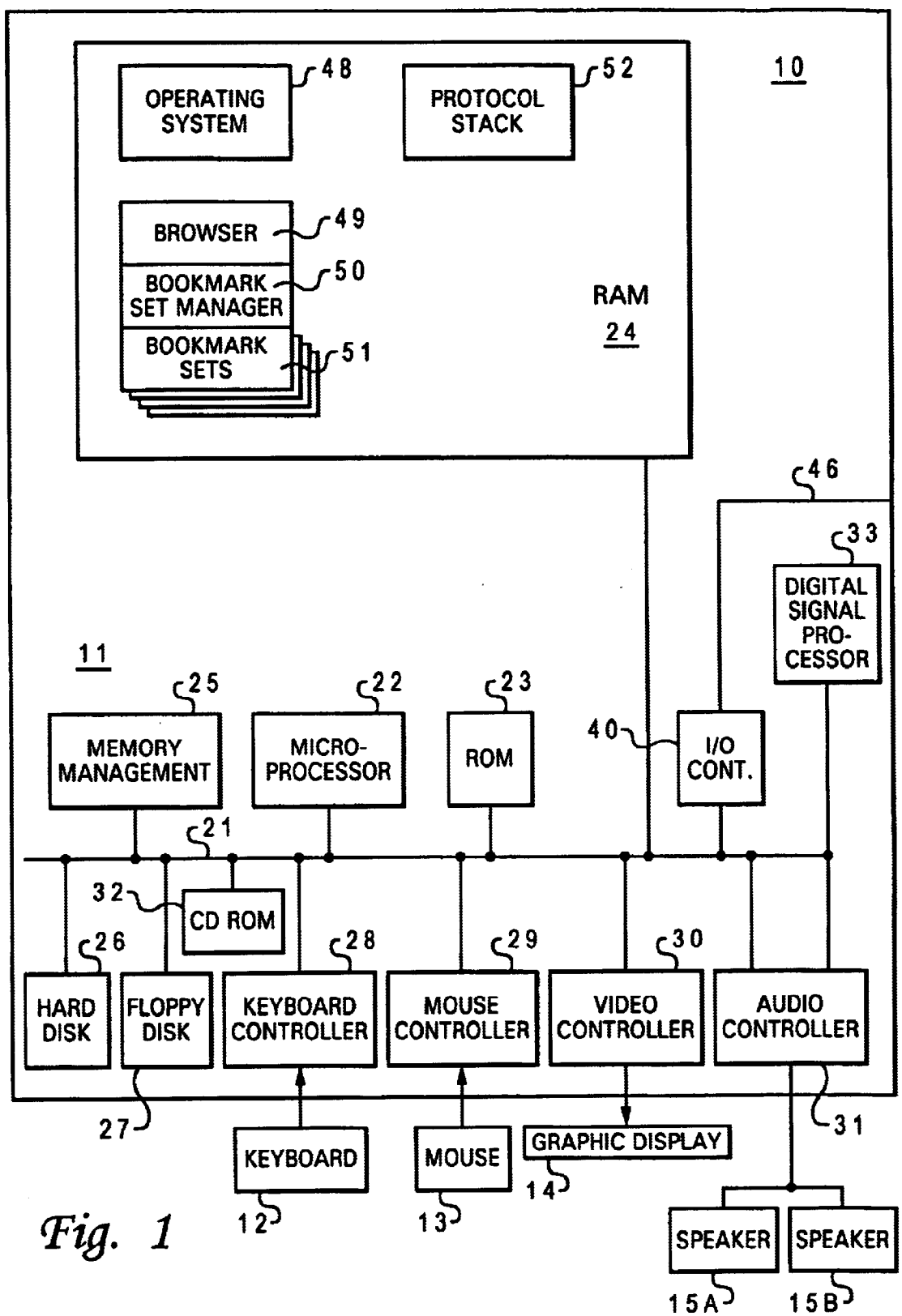
FIG. 1 is an overall block diagram of the computer hardware system for implementing the present invention web page animated construction and display and zoom in and out viewing of a large web page.

With reference now to the figures and in particular with reference to FIG. 1, an overall block diagram of the computer hardware system 10 for implementing the present invention web page animated construction and display and/or zoom in and out viewing of a web page is shown. The hardware system 10 is generally a computer system that provides Internet access and web browsing and is able to retrieve and display web pages. The hardware system 10 has a number of computer sub-systems in communications with or to each other on a communications bus 21. The various computer sub-systems coupled to the bus 21 include but are not limited to the following systems or devices: a memory management system 25, a microprocessor 22, a read only memory (ROM) system 23, a random access memory (RAM) system 24, an input/output controller (I/O CONT.) 40, a digital signal processor 33, a hard disk 26, a floppy disk 27, a CD ROM 32, a keyboard controller 28, a mouse controller 29, a video controller 30, and an audio controller 31. The I/O CONT. 40 provides communications to an input/output device via line 46. A keyboard 12 is coupled to the keyboard controller 28. A mouse 13 is coupled to the mouse controller 29. A graphic display 14 is coupled to the video controller 30. Speakers 15A and 15B are coupled to the audio controller 31. The RAM system 24 is divided into at least the following memory allocations: 1) operating system 48; 2) protocol stack 52; 3) a browser or web browser 49; 4) a bookmark set manager 50; and 5) bookmark sets 51. The present invention is not in any way limited to the specific hardware disclosed above for the system 10, and any suitable system, sub-system, and/or device may be used to implement the present invention or in conjunction with the present invention.

Figure 2:
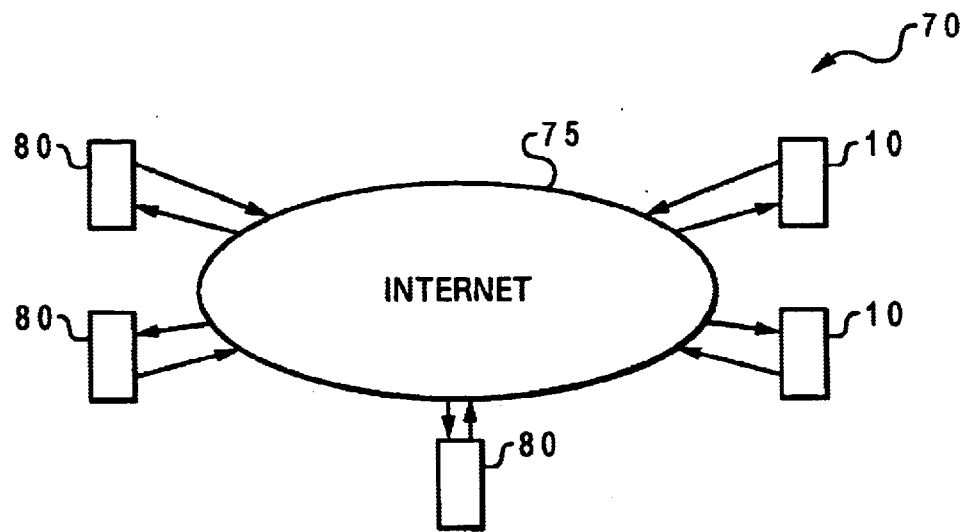
FIG. 2 is an overall block diagram of computer systems and servers communicating over the Internet wherein each of the computer systems is able to implement the present invention web page animated construction and display and zoom in and out viewing of a large web page.
Figure 3:
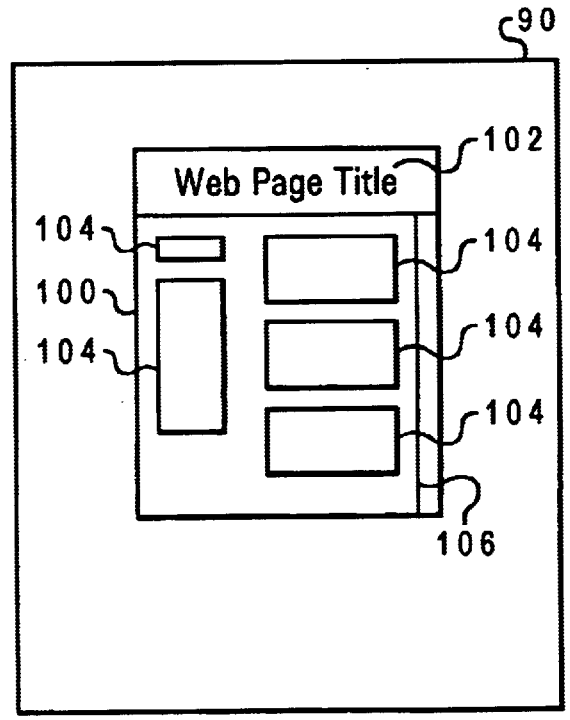
FIG. 3 is a prior art figure showing a view of a computer screen with a retrieved web page therein.

With reference now to the figures and in particular with reference to FIG. 2, an overall block diagram 70 of computer systems 10 and servers 80 communicating over the Internet or World Wide Web 75 is shown. Each of the computer systems 10 is able to implement the present invention web page animated construction and display and zoom in and out viewing of a large web page. As stated earlier, FIG. 3 is a prior art figure that shows a computer screen 90 with a retrieved web page 100. The problems with the prior art ways of drawing and displaying a web page 100 were discussed earlier.

Figure 5:
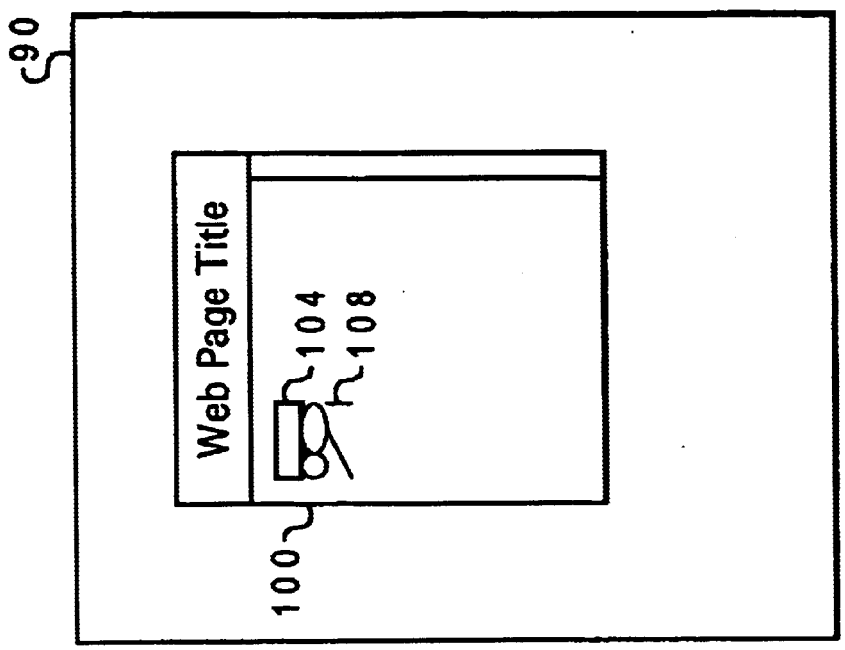
FIG. 5 is a view of a computer screen showing a subsequent step of the web page construction in FIG. 4 wherein the web page is being constructed by the animated mover character.
Figure 4:
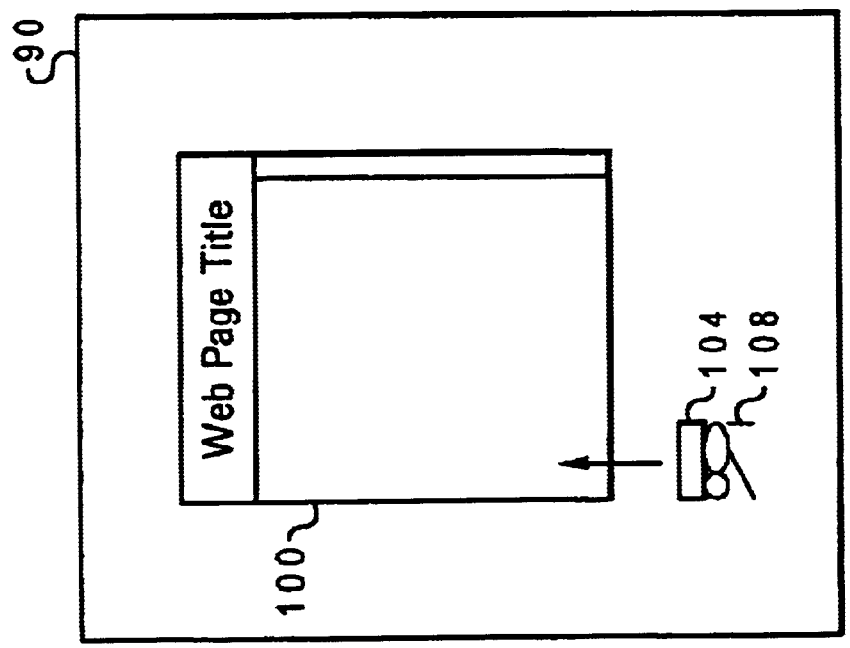
FIG. 4 is a view of a computer screen showing an initial step of a web page being constructed by an animated mover character.

With reference now to the figures and in particular with reference to FIG. 4, a computer screen 90 displaying an initial step of a web page 100 being constructed by the present system and method of using an animated mover character 108 is shown. The present invention discloses the use of animated mover characters, such as animals, persons, object movers, etc. The present invention, however, is not in any way limited to the specific animated mover characters disclosed in this specification, and any suitable character, object, or method used for representing the moving of web objects for the web page 100 or the construction of the web page 100 may be used with the present invention. Furthermore, the present invention may also utilize a multiple step animation process, such as a twelve step animation process, in showing or portraying movement or sliding of the web object 104 by the character 108. FIG. 4 shows one of the web objects 104 initially drawn on the computer screen 90, but it is drawn off of the web page 100. The animated mover character 108 is drawn below the web object 104, symbolizing that it is or will be moving the object 104. In FIG. 4, the animated mover character 108 is drawn to be an animal. With reference now to the figures and in particular with reference to FIG. 5, the computer screen 90 then shows a subsequent step of the web page construction that was initiated at FIG. 4. FIG. 5 shows that animated mover character 108 has moved the web object 104 to its appropriate place on the web page 100.

Figure 6:
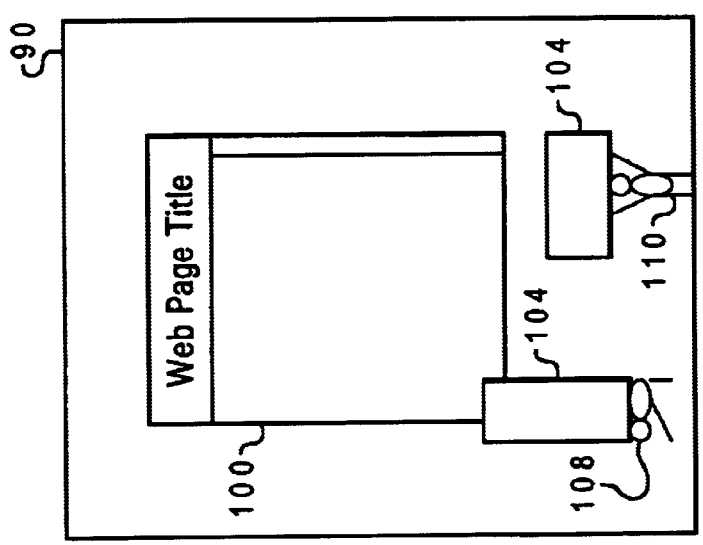
FIG. 6 is a view of a computer screen showing an initial step of a web page being constructed by two animated mover characters.

With reference now to the figures and in particular with reference to FIG. 6, a computer screen 90 displaying an initial step of a web page 100 being constructed by multiple animated mover characters 108 is shown. FIG. 6 shows two web objects 104 initially drawn on the computer screen 90, but they are both drawn off of the web page 100. An animated mover character 108 is drawn below each of the two web objects 104. Each animated character 108 symbolizes that it is or will be moving the respective web object 104. In FIG. 6, an animal mover character 108 is drawn below the left web object 104 while a person mover character 108 is drawn below the right web object 104.

Figure 7:
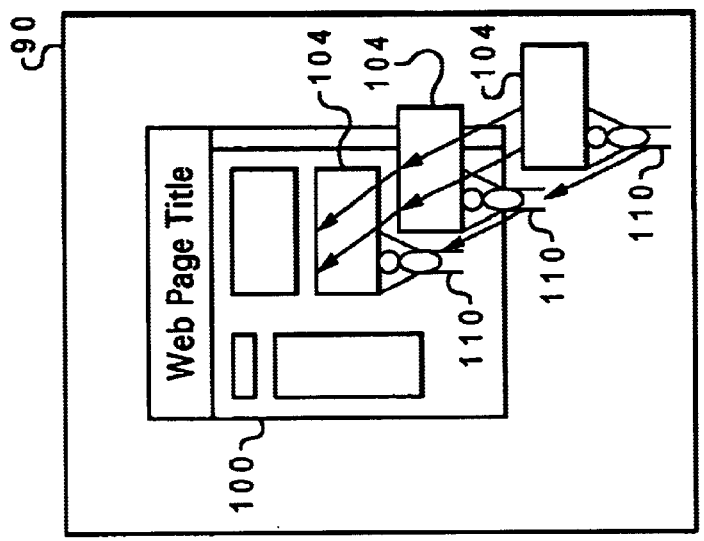
FIG. 7 is a view of a computer screen showing the web page of FIG. 6 continuing to be constructed by having the animated mover character(s) move each piece(s) or portion(s) or object(s) onto the web page viewing area.
Figure 8:
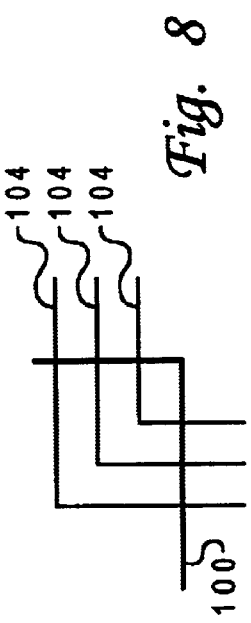
FIG. 8 is a view of a corner of the web page viewing area wherein an object is being moved from the outside to the inside of the web page.

With reference now to the figures and in particular with reference to FIG. 7, a computer screen 90 displaying the web page 100 that is in the process of being constructed by a person mover character 108 is shown. FIG. 7 shows that the right, lower web object 104 and the person mover character 108 below it are drawn on the computer screen 90 outside of the web page 100. The object 104 and character 108 are gradually slid or moved from outside of the web page 100 to its appropriate place inside of the web page 100. The images at locations that are behind and are covered by the object 104 and character 108 are stored into memory, and the images are restored by retrieving them from stored memory as the object 104 and character 108 slide over and are no longer covering the respective locations with the images. With reference now to the figures and in particular with reference to FIG. 8, a corner of the viewing area of the web page 100 is shown. FIG. 8 shows a web object 104 being gradually slid and moved from the outside of the web page 100 to the inside of the web page 100.

Figure 9:
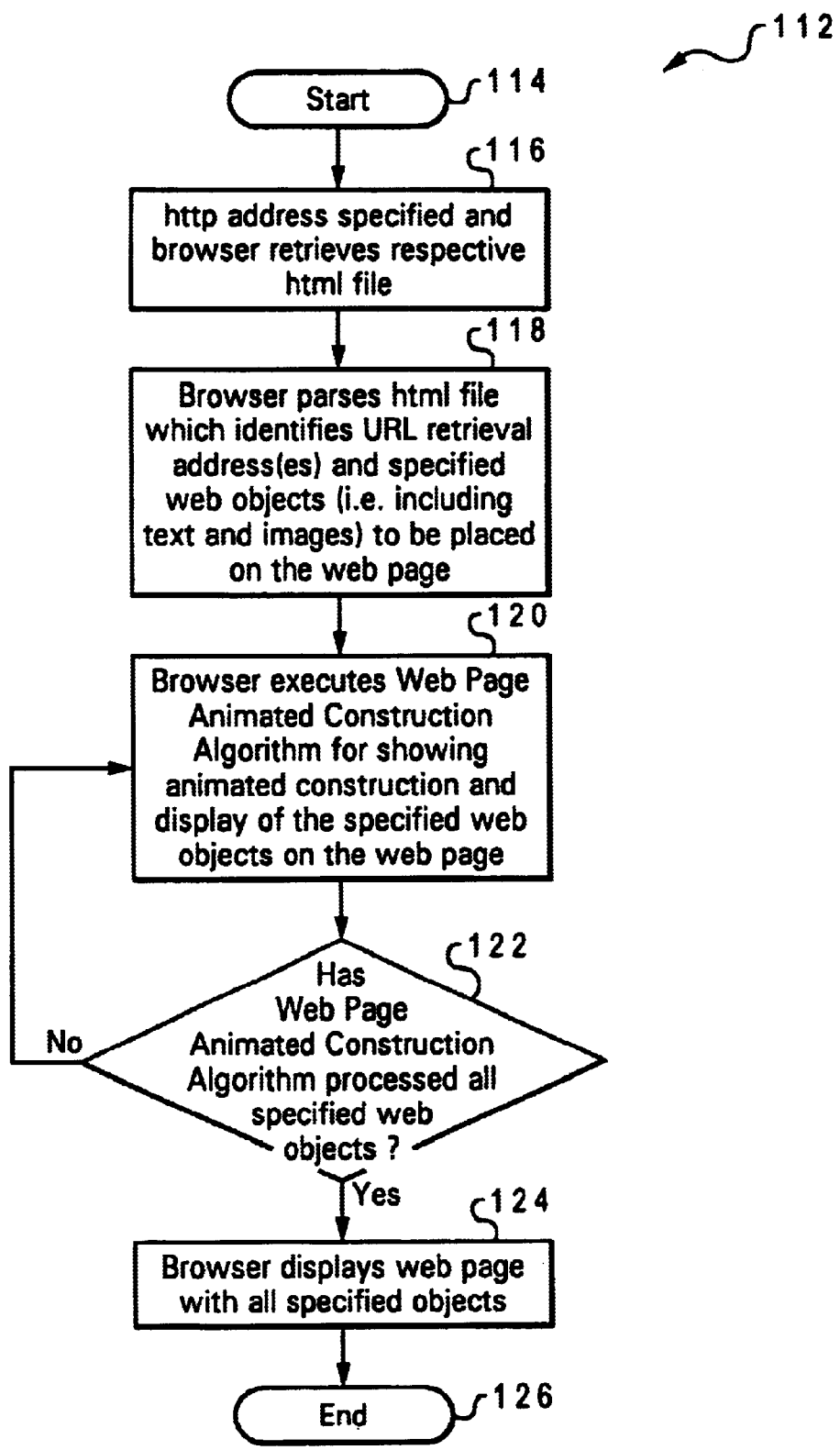
FIG. 9 is a flow chart of an algorithm for displaying a web page by a web browser wherein the web browser implements a web page animated construction algorithm.

With reference now to the figures and in particular with reference to FIG. 9, a flow chart of an algorithm 112 for displaying a web page 100 by a web browser 49 wherein the web browser 49 implements the present invention web page animated construction algorithm is shown. The algorithm 112 starts at block 114. The algorithm 112 moves to block 116 where the http address is specified and the browser 49 retrieves the respective html file. The algorithm 112 then moves to block 118. At block 118, the browser 49 parses the html file which identifies the URL retrieval address(es) and specified web objects 104, which includes text and images, to be placed on the web page 100. The algorithm 112 then moves to block 120 where the browser 49 executes the present invention web page animated construction algorithm (such as the example algorithm 130 in FIG. 10 to be later be discussed in more detail). The web page animated construction algorithm is not limited to the one disclosed in this specification, and any suitable animated construction algorithm may be used with the present invention. The web page animated construction algorithm shows animated construction and display of the specified web objects 104 on the web page 100. The algorithm 112 then moves to decision block 122. At decision block 122, the algorithm 112 determines whether the web page animated construction algorithm has processed all of the specified web objects 104. If the web page animated construction algorithm has not processed all of the specified web objects 104, then the algorithm 112 loops back to block 120 and continues therefrom. If the web page animated construction algorithm has processed all of the specified web objects 104, then the algorithm 112 moves to block 124. At block 124, the browser 49 displays the web page 100 with all specified objects 104, and the animated mover character(s) 108 is/are all eventually removed from display. The algorithm 112 ends at block 126.

Figure 10:
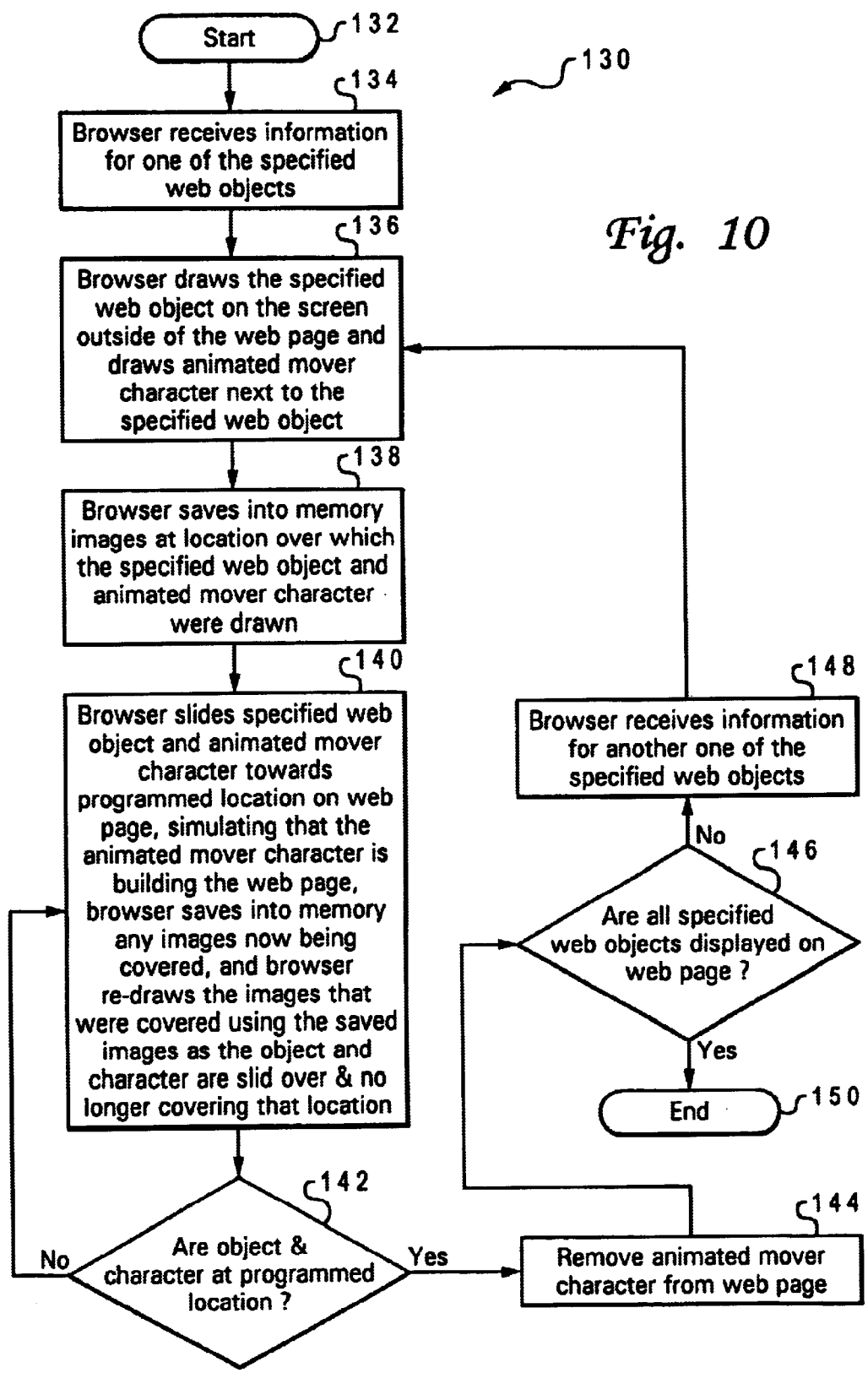
FIG. 10 is a flow chart of an example web page animated construction algorithm that is able to be used in and implemented by the algorithm of FIG. 9.

With reference now to the figures and in particular with reference to FIG. 10, a flow chart of an example web page animated construction algorithm 130 is shown. The algorithm 130 is able to be used in and implemented by the algorithm 112 of FIG. 9 at block 120. The algorithm 130 starts at block 132. The algorithm 130 moves to block 134 where the browser 49 receives information for one of the specified web objects 104. The algorithm 130 then moves to block 136 where the browser 49 draws the specified web object 104 on the screen 90 outside of the web page 100 and draws the animated mover character 108 next to or near the specified web object 104 to symbolize that the character 108 is or will be moving or sliding the web object 104 to its appropriate place on the web page 100. The algorithm 130 then moves to block 138. At block 138, the browser 49 saves into memory the images at the location over which the specified web object 104 and the animated mover character 108 were drawn. The algorithm 130 then moves to block 140. At block 140, the browser 49 moves or slides the specified web object 104 and the animated mover character 108 towards its programmed and appropriate location on the web page 100. The object 104 and character 108 are slid and moved on the screen 90 in a manner which simulates that the animated mover character 108 is building the web page 100. The browser saves into memory any images now being covered by the object and character 108. The browser 49 re-draws the images at the locations that were covered by the object 104 and character 108 by retrieving and using the saved images in memory as the object 104 and character 108 are slid over and no longer covering that location.

The algorithm 130 then moves to decision block 142. At decision block 142, the algorithm 130 determines whether the object 104 and character 108 have arrived at the final appropriate and programmed location. If they have not yet arrived, then the algorithm 130 loops back to block 140 and continues therefrom. However, if they have arrived, then the algorithm 130 moves to block 144. At block 144, the animated mover character 108 is removed from the web page 100. The algorithm 130 moves to decision block 146. At decision block 146, the algorithm 130 determines whether all specified web objects 104 have been displayed on the web page 100. If all web objects 104 have not been displayed, then the algorithm 130 moves to block 148 where the browser 49 receives information for another one of the specified web objects 104, and the algorithm 130 loops back to block 136 where it continues therefrom. On the other hand, if all web objects 104 have been displayed on the web page 100, then the algorithm 130 ends at block 150.

Figure 13:
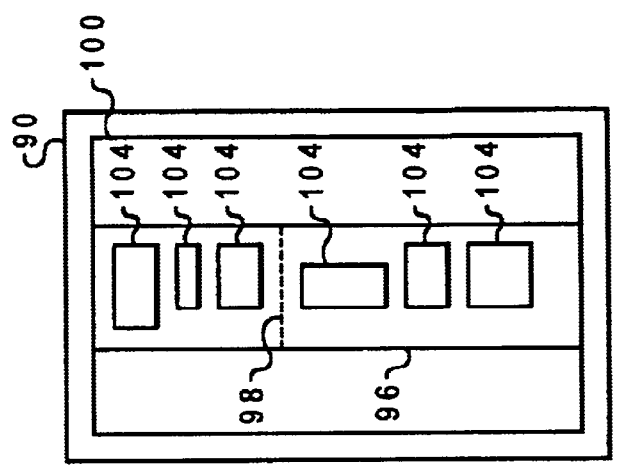
FIG. 13 is a view of a computer screen with a web page viewing area that is further zoomed out so that the entire web page may be seen when the web page is being retrieved.
Figure 12:
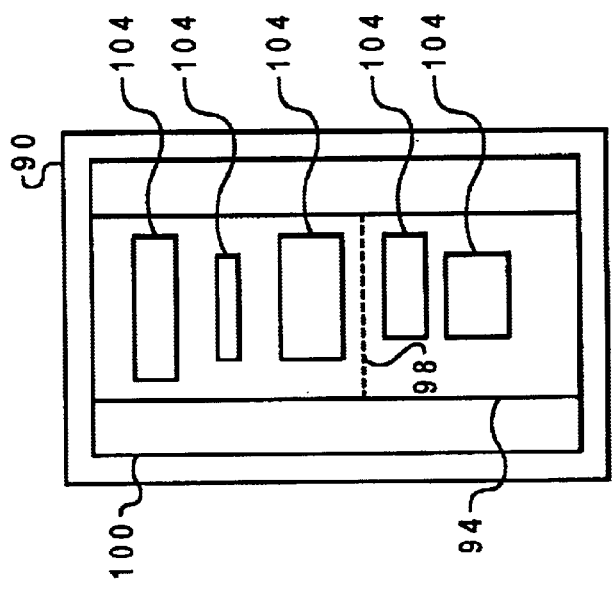
FIG. 12 is a view of a computer screen with a web page viewing area that is zooming out so that more portions of the entire web page may be seen when the web page is being retrieved.
Figure 11:
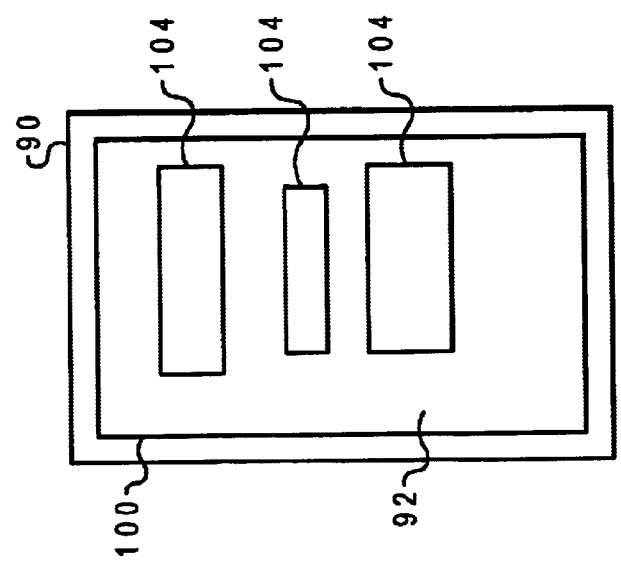
FIG. 11 is a view of a computer screen with a web page viewing area showing a portion of an entire web page when the web page is being retrieved.

FIGS. 11 to 17 illustrate the zoom in and out viewing of a large web page feature of the present invention. With reference now to the figures and in particular with reference to FIGS. 11 to 13, the zoom out process of a web page 100 when web objects 104 are retrieved and exceed the viewing area of a web page 100 is illustrated. FIG. 11 shows a computer screen 90 with a web page viewing area 92 showing a portion of an entire web page 100 when the web page 100 is being retrieved. As more web objects 104 are being retrieved for web page 100 that exceed the viewing area 92, FIG. 12 shows a proportionally and more zoomed out viewing area 94 that replaces the viewing area 92. The more zoomed out viewing area 94 is provided on the web page 100 to accommodate the showing of the additionally retrieved web objects 104. The zooming out of the viewing area continues until a viewing area 96 that shows the entire web page 100 with all web objects 104 is displayed on the computer screen 90 for the user or viewer as shown in FIG. 13. The dotted reference line 98 in views 94 and 96 in respective FIGS. 12 and 13 shows the viewer the relative and proportional position of the portion being initially viewed in view 92 of FIG. 11 in relative to the larger portion of the web page 100 or the entire web page 100.

Figure 16:
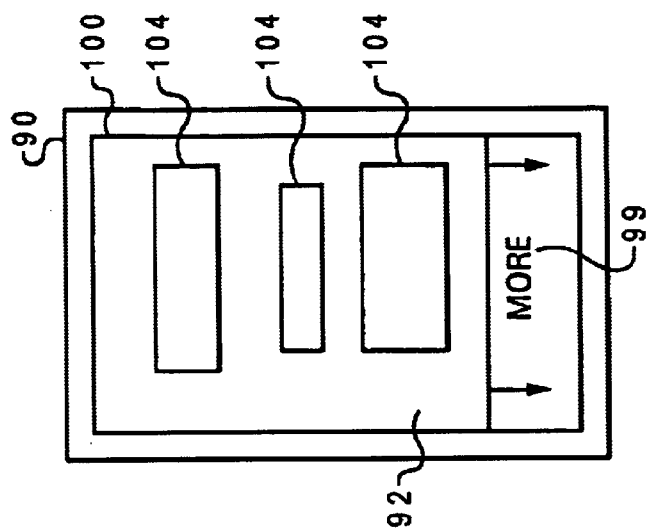
FIG. 16 is a view of a computer screen with a web page viewing area that is zoomed back in showing only a portion of the entire web page after the entire web page has been retrieved and seen wherein a more indicator area is located beneath the web page portion for indicating to the user that more portions of the web page exist therebelow.
Figure 15:
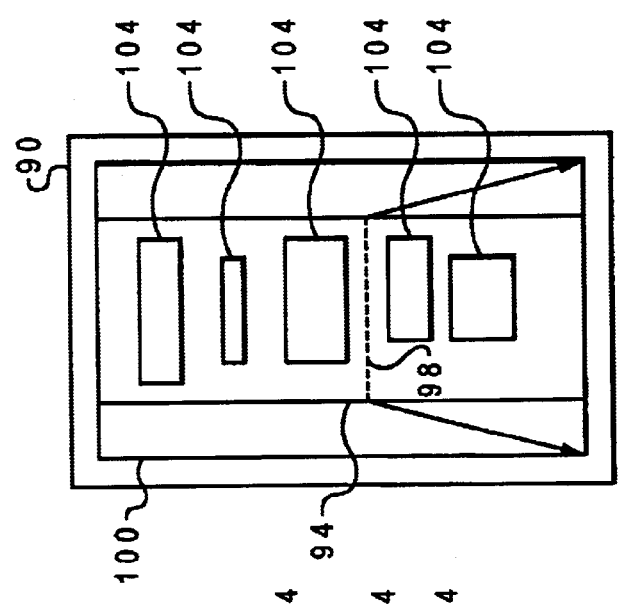
FIG. 15 is a view of a computer screen with a web page viewing area that continues to zoom back in showing only portions of the entire web page after the entire web page has been retrieved and seen.
Figure 14:
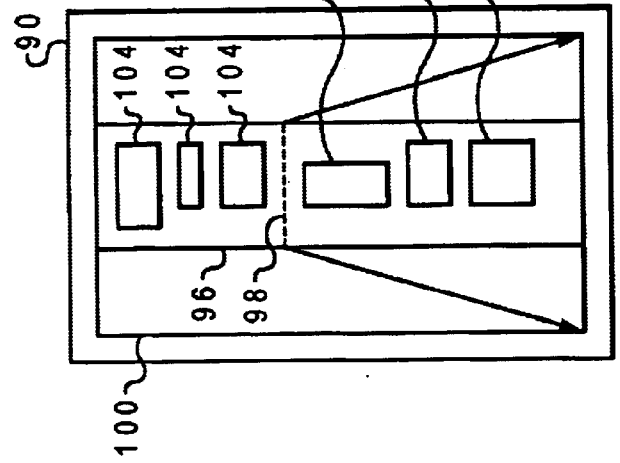
FIG. 14 is a view of a computer screen with a web page viewing area that is zooming back in after the entire web page has been retrieved and seen.

With reference now to the figures and in particular with reference to FIGS. 14 to 16, the zoom in process of a web page 100 after the entire web page 100 with all web objects 104 have been retrieved is illustrated. FIG. 14 shows that the entire web page 100 is being zoomed in after it has been retrieved with all objects 104. FIG. 15 shows that the web page viewing area 96 of FIG. 14 has been replaced with a more zoomed in viewing area 94, which shows less of the entire web page 100. FIG. 16 shows an even more zoomed in view 92 of the same initial portion of the web page 100 as shown in FIG. 12. The dotted reference line 98 in views 96 and 94 of respective FIGS. 14 and 15 aid in showing the zooming in process of the initial portion of the web page 100. The reference line 98 also reflects the relative and proportional position of the initial portion in relationship to the larger portion of the web page 100 or the entire web page 100. A "more" bar 99 located at the bottom of the initial portion or any other suitable indicator for providing a way of indicating to the user or viewer that other additional, unseen portions of the web page 100 may be scrolled to and viewed is provided and shown in FIG. 16.

Figure 17:
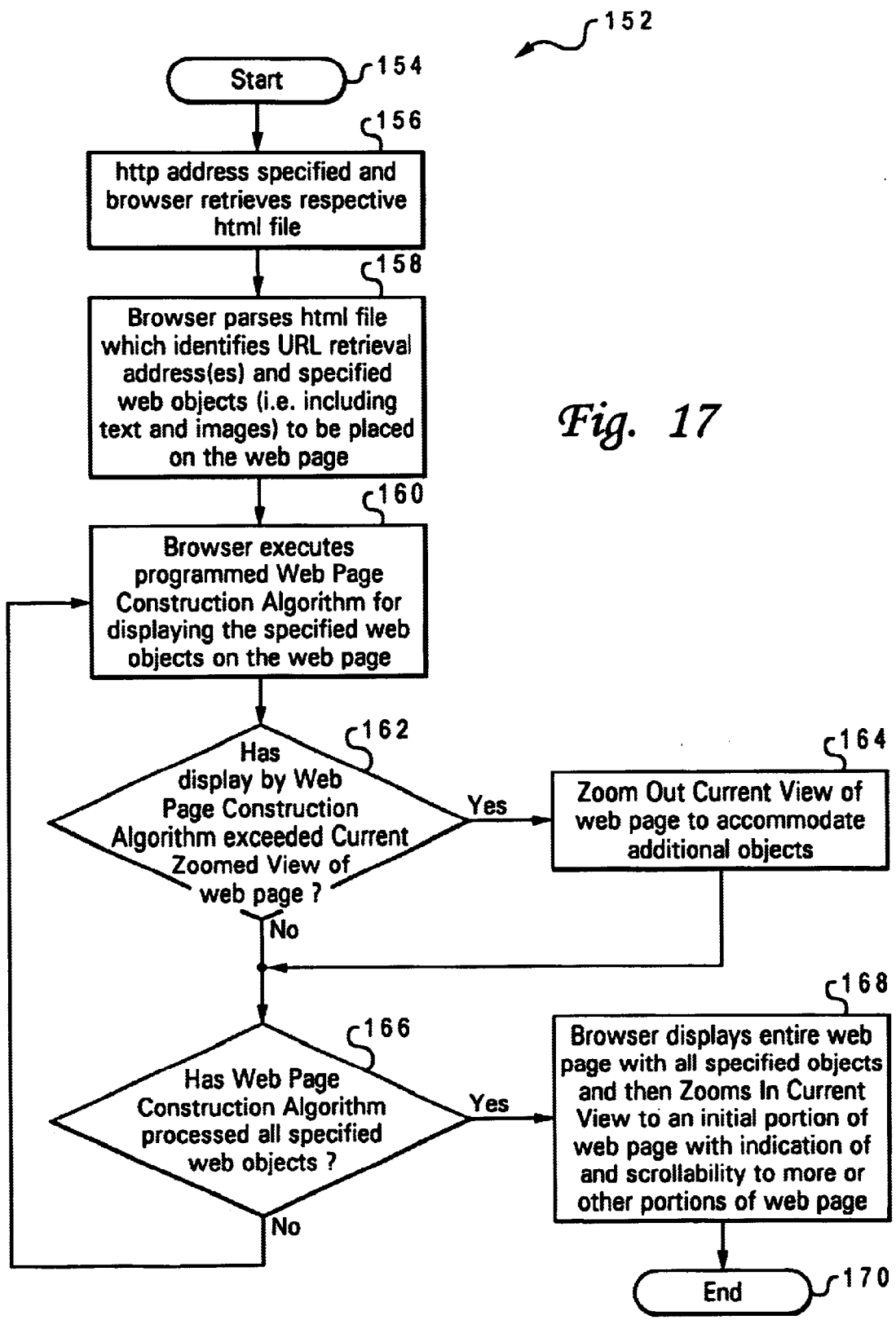
FIG. 17 is a flow chart of an algorithm for displaying a web page by a web browser wherein the web browser implements the zoom in and out viewing of a web page as shown in FIGS. 11 to 16.

With reference now to the figures and in particular with reference to FIG. 17, a flow chart of an algorithm 152 for displaying a web page 100 by a web browser 49 wherein the web browser 49 implements the zoom in and zoom out viewing of a web page feature of the present invention is shown. The algorithm 152 starts at block 154. The algorithm 152 moves to block 156. At block 156, an http address is specified, and the browser 49 retrieves the respective html file. The algorithm 152 moves to block 158 where the browser 49 parses the html file which identifies the URL retrieval address(es) and specified web objects 104, which includes text and images, to be placed on the web page 100. The algorithm 152 then moves to block 160 where the browser 49 executes a programmed web page construction algorithm for displaying the specified web objects 104 on the web page 100. The web page construction algorithm may be the web page animated construction algorithm 130 of FIG. 10 discussed earlier or any other suitable web page animated construction algorithm, whereby the animated construction feature and the zoom in and out of the web page feature would, in effect, be combined. Alternatively, the web page construction algorithm may be any web page display algorithm or any conventional web page construction algorithm. Thus, the present invention zoom in and out algorithm is not in any way limited to being used with a specific web page construction algorithm, and any suitable web page construction algorithm may be used with the present invention.

The algorithm 152 then continues at decision block 162. At decision block 162, the algorithm 152 determines whether the display by the web page construction algorithm has exceeded the current zoomed view of the web page 100. If the display has exceeded the current zoomed view, then the algorithm 152 moves to block 164 where the current view of the web page 100 is zoomed out to accommodate the view of additional object(s) 104, and the algorithm 152 then moves to decision block 166. On the other hand, if the display has not exceeded the current zoomed view, then the algorithm 152 moves directly from decision block 162 to decision block 166. At decision block 166, the algorithm 152 determines whether the web page construction algorithm has processed all of the specified web objects 104. If it has not processed all specified objects 104, then the algorithm 152 loops back to block 160 and continues therefrom. However, if it has processed all specified objects 104, then algorithm 152 moves to block 168. At block 168, the browser 49 displays the entire web page 100 with all specified objects 104. The browser 49 then zooms in the current view to an initial portion of the web page 100. An indicator, such as the "More" bar 99 in FIG. 16, is provided near the zoomed-in initial portion for indicating scrollability and accessibility by the user or viewer to more or other portion(s) of the web page 100. The algorithm 152 ends at block 170.

While the invention has been particularly shown and described with reference to a preferred embodiment, it will be understood by those skilled in the art that various changes in form and detail may be made therein without departing from the spirit and scope of the invention.

What is claimed is:

1. A method for constructing and displaying a web page, on a display screen, said method comprising:

in response to receipt of a specified hyper-text transport protocol (http) address, a browser retrieving a markup language file identified by the specified http address, the browser parsing the markup language file to identify, within the markup language file, at least one universal resource locator (URL) retrieval address and automatically retrieving a plurality of web objects from one or more storage locations associated with said at least one URL retrieval address, in response to retrieving said plurality of web objects, displaying at least one web object on the display screen outside of a boundary of the web page, displaying at least one mover character in association with said web page, and animating movement of the at least one web object from outside the boundary of the web page to a programmed location inside the boundary of the web page while animating movement of said at least one mover character, wherein said movements of the at least one web object and said at least one mover character simulates the at least one mover character building the web page by placing said at least one web object at the programmed location.

2. The method according to claim 1, wherein the at least one web object is a multiple number of web objects.

3. The method according to claim 1, further comprising the steps of:

saving, by the browser, into a memory device an image covering a location over which the at least one web object and the at least one mover character have been drawn on the display screen, re-drawing the image that was covered using the at least one image saved in the memory device as the at least one web object and the at least one mover character are slid over and no longer covering the location, determining whether the at least one web object and the at least one mover character are at the programmed location, repeating the sliding step, the saving step, and the re-drawing step if the at least one web object and the at least one mover character are not at the programmed location, and removing the at least one mover character from the web page if the at least one web object and the at least one mover character are at the programmed location.

4. The method according to claim 3, further comprising the steps of:

determining whether all of the at least one web object have been displayed within the boundary of the web page, repeating the animating movement step for all remaining of the at least one web object if all of the at least one web object have not been displayed on the web page.

5. The method according to claim 1, wherein the at least one mover character is at least one animal mover character.

6. The method according to claim 1, wherein the at least one mover character is at least one person mover character.

7. The method according to claim 1, further comprising:

discontinuing display of the at least one mover character within the web page if all of the at least one web objects is displayed at the programmed location.

8. A system for constructing and displaying a web page, on a display screen, said system comprising:

a web page processing system for processing the web page, a display screen coupled to the web page processing system, a data storage device storing a browser executable by said web page processing system, wherein said browser includes:

means, responsive to receipt of a specified hyper-text transport protocol (http) address, for retrieving a markup language file identified by the specified http address, means for parsing the markup language file to identify, within the markup language file, at least one universal resource locator (URL) retrieval address and for automatically retrieving a plurality of web objects from one or more storage locations associated with said at least one URL retrieval address, means for displaying the at least one web object on the display screen outside a boundary of the web page, means for displaying at least one mover character in association with the web page, and means for animating movement of the at least one web object from outside the boundary of the web page to a programmed location inside the boundary of the web page while animating movement of said at least one mover character, wherein the movement of the at least one web object and the at least one mover character simulates the at least one mover character building the web page by placing said at least one web object at the programmed location.

9. A program product for constructing and displaying a web page, on a display screen, said program product comprising:

a computer usable medium; and a browser encoded within said computer usable medium, said browser including:

means, responsive to receipt of a specified hyper-text transport protocol (http) address, for retrieving a markup language file identified by the specified http address, means for parsing the markup language file to identify, within the markup language file, at least one universal resource locator (URL) retrieval address and for automatically retrieving a plurality of web objects from one or more storage locations associated with said at least one URL retrieval address, means for displaying the at least one web object on the display screen outside a boundary of the web page, means for displaying at least one mover character in association with the web page, and means for animating movement of the at least one web object from outside the boundary of the web page to a programmed location inside the boundary of the web page while animating movement of said at least one mover character, wherein the movement of the at least one web object and the at least one mover character simulates the at least one mover character building the web page by placing said at least one web object at the programmed location.

10. The program product according to claim 9, wherein said computer usable media is a memory medium.

11. The program product according to claim 9, wherein said computer usable media is a floppy disk.

* * * * *